United States Patent
Cass et al.

(10) Patent No.: US 7,198,315 B2
(45) Date of Patent: Apr. 3, 2007

(54) CONNECTOR FOR AUTOMOTIVE INTERIOR TRIM

(75) Inventors: Michael W Cass, Lenox, MI (US); John D Youngs, Southgate, MI (US)

(73) Assignee: Lear Corporation, Southfield, MI (US)

( * ) Notice: Subject to any disclaimer, the term of this patent is extended or adjusted under 35 U.S.C. 154(b) by 90 days.

(21) Appl. No.: 10/907,162

(22) Filed: Mar. 23, 2005

(65) Prior Publication Data

US 2006/0214468 A1    Sep. 28, 2006

(51) Int. Cl.
*B62D 27/00*    (2006.01)
(52) U.S. Cl. .................. 296/29; 411/508; 411/509; 24/297; 296/146.7
(58) Field of Classification Search ............ 296/29, 296/146.7, 39.1, 1.08; 24/297; 52/208, 52/239; 174/72 A; 411/508, 907; 439/34, 439/248, 247
See application file for complete search history.

(56) References Cited

U.S. PATENT DOCUMENTS

| | | | | |
|---|---|---|---|---|
| 2,983,008 | A * | 5/1961 | Von Rath ..................... | 24/297 |
| 3,249,973 | A * | 5/1966 | Seckerson .................... | 411/509 |
| 3,309,955 | A * | 3/1967 | Turnbull et al. ............. | 411/509 |
| 3,771,275 | A * | 11/1973 | Seckerson .................... | 52/508 |
| 3,810,279 | A * | 5/1974 | Swick et al. ................ | 411/508 |
| 3,860,999 | A * | 1/1975 | Meyer ......................... | 411/510 |
| 4,122,583 | A * | 10/1978 | Grittner et al. ............. | 24/703.1 |
| 4,393,551 | A * | 7/1983 | Wollar et al. ................. | 24/627 |
| 4,420,859 | A * | 12/1983 | Hammerle ................. | 24/595.1 |
| 4,427,328 | A * | 1/1984 | Kojima ........................ | 24/625 |
| 4,648,766 | A * | 3/1987 | Wollar ......................... | 411/41 |
| 4,715,095 | A * | 12/1987 | Takahashi .................... | 24/297 |
| 4,716,633 | A * | 1/1988 | Rizo ............................ | 24/297 |
| 4,717,301 | A * | 1/1988 | Oddenino .................... | 411/373 |
| D297,614 | S * | 9/1988 | Yokoyama et al. .......... | D8/382 |
| D297,615 | S * | 9/1988 | Nakama ....................... | D8/382 |
| 4,778,320 | A * | 10/1988 | Nakama ..................... | 411/509 |

(Continued)

FOREIGN PATENT DOCUMENTS

EP    1 128 077 A1    8/2001

(Continued)

OTHER PUBLICATIONS

The United Kingdom Patent Office, Patents Act 1977: Combined Search and Examination Report Under Sections 17 and 18(3), Application No. GB0605789.7, Dated Jun. 27, 2006 (6 pages).

(Continued)

*Primary Examiner*—Kiran B. Patel
(74) *Attorney, Agent, or Firm*—Wood, Herron & Evans, LLP

(57) ABSTRACT

A connector for securing an interior trim assembly to a support of an automobile. The connector includes a connector body having a head portion formed at a proximal end of the connector body and a shank portion extending from the head portion toward a distal end of the connector body. A sealing gasket is integrally molded onto the connector body distally of the head portion. A two-shot molding process may be used to form the connector with the connector body being formed in the first shot of the molding process and the sealing gasket being formed onto the connector body in the second shot of the molding process.

5 Claims, 6 Drawing Sheets

U.S. PATENT DOCUMENTS

| | | | |
|---|---|---|---|
| 4,987,656 A * | 1/1991 | Sato | 24/297 |
| 5,056,199 A * | 10/1991 | Stein et al. | 24/682.1 |
| 5,111,619 A | 5/1992 | Billin et al. | 49/502 |
| 5,173,026 A * | 12/1992 | Cordola et al. | 411/508 |
| 5,319,839 A * | 6/1994 | Shimajiri | 24/453 |
| 5,345,720 A | 9/1994 | Illbruck et al. | |
| D355,113 S * | 2/1995 | Shimajiri | D8/382 |
| 5,419,606 A * | 5/1995 | Hull et al. | 296/146.7 |
| 5,462,482 A | 10/1995 | Grimes | |
| 5,505,024 A | 4/1996 | DeRees et al. | |
| 5,507,610 A * | 4/1996 | Benedetti et al. | 411/509 |
| 5,526,549 A | 6/1996 | Mori et al. | 16/2 |
| 5,540,528 A * | 7/1996 | Schmidt et al. | 411/55 |
| 5,595,415 A | 1/1997 | Beaulat | |
| 5,601,261 A | 2/1997 | Koike | 248/71 |
| 5,618,477 A | 4/1997 | Suzuki | 264/46.5 |
| 5,639,993 A | 6/1997 | Ideno et al. | 174/153 G |
| 5,647,713 A * | 7/1997 | Ge et al. | 411/509 |
| 5,689,863 A * | 11/1997 | Sinozaki | 24/297 |
| 5,694,666 A * | 12/1997 | Hamamoto | 24/297 |
| 5,695,865 A | 12/1997 | Shimizu | 428/212 |
| 5,857,244 A * | 1/1999 | Edwards et al. | 24/297 |
| 5,866,232 A | 2/1999 | Gatzmanga | 428/122 |
| 5,947,547 A | 9/1999 | Deeks et al. | 296/146.7 |
| 5,975,820 A * | 11/1999 | Kirchen | 411/339 |
| 5,981,877 A | 11/1999 | Sakata et al. | 174/153 G |
| 6,064,003 A | 5/2000 | Moore et al. | 174/65 G |
| 6,076,882 A | 6/2000 | Szerdahelyi et al. | 296/146.1 |
| 6,116,678 A * | 9/2000 | Beck | 296/146.15 |
| 6,119,406 A | 9/2000 | Gulisano et al. | 49/502 |
| 6,183,038 B1 | 2/2001 | Hansen et al. | 296/146.7 |
| 6,196,607 B1 * | 3/2001 | Gulisano | 296/39.1 |
| 6,197,403 B1 | 3/2001 | Brown et al. | 428/137 |
| 6,210,613 B1 | 4/2001 | Stein et al. | 264/45.4 |
| 6,226,927 B1 | 5/2001 | Bertolini et al. | |
| 6,264,393 B1 * | 7/2001 | Kraus | 403/282 |
| 6,287,043 B1 * | 9/2001 | Kraus | 403/297 |
| 6,299,236 B1 | 10/2001 | Praud et al. | |
| 6,305,055 B1 * | 10/2001 | Castro | 411/508 |
| 6,308,488 B1 | 10/2001 | Hoshino | 52/716.5 |
| 6,336,768 B1 * | 1/2002 | Kraus | 403/408.1 |
| 6,372,995 B1 | 4/2002 | Mochizuki et al. | 174/152 G |
| D456,699 S * | 5/2002 | Nakanishi | D8/382 |
| 6,393,766 B2 | 5/2002 | Nozaki et al. | |
| 6,412,852 B1 | 7/2002 | Koa et al. | |
| 6,422,640 B2 | 7/2002 | Whitehead et al. | 296/146.7 |
| 6,425,208 B1 | 7/2002 | Klueger et al. | |
| 6,447,047 B1 | 9/2002 | Marcovecchio et al. | |
| 6,525,269 B2 | 2/2003 | Sato | 174/65 G |
| 6,564,433 B2 | 5/2003 | Nagasawa | 24/297 |
| 6,572,317 B2 * | 6/2003 | Okada et al. | 411/508 |
| 6,594,870 B1 * | 7/2003 | Lambrecht et al. | 24/297 |
| 6,594,955 B1 | 7/2003 | Delire et al. | |
| 6,612,795 B2 * | 9/2003 | Kirchen | 411/508 |
| 6,616,216 B2 | 9/2003 | Furuyama et al. | |
| 6,656,397 B1 | 12/2003 | Hansen et al. | 264/45.4 |
| 6,659,536 B1 | 12/2003 | Chamberlain et al. | 296/146.5 |
| 6,660,937 B1 | 12/2003 | MacLeod et al. | 174/65 G |
| 6,676,195 B1 | 1/2004 | Marriott et al. | |
| 6,683,257 B1 | 1/2004 | Roberts et al. | 174/135 |
| 6,698,140 B2 | 3/2004 | Tatsumi et al. | |
| 6,703,129 B1 | 3/2004 | Kakehi et al. | 428/409 |
| 6,814,382 B2 * | 11/2004 | Kohara et al. | 296/1.03 |
| 6,916,145 B2 * | 7/2005 | Lydan | 411/510 |
| 6,926,340 B2 | 8/2005 | Moriyama | |
| 6,932,415 B1 | 8/2005 | Van Houzen et al. | |
| 6,983,978 B2 * | 1/2006 | Radu et al. | 296/146.7 |
| 7,017,239 B2 * | 3/2006 | Kurily et al. | 24/297 |
| 7,033,121 B2 * | 4/2006 | Kirchen | 411/48 |
| 7,059,288 B2 * | 6/2006 | Merrick et al. | 123/145 A |
| 7,059,658 B2 * | 6/2006 | Ziegler et al. | 296/146.7 |
| 2001/0017476 A1 | 8/2001 | Nishikawa et al. | |
| 2001/0030444 A1 | 10/2001 | Whitehead et al. | 296/146.7 |
| 2002/0084674 A1 | 7/2002 | Dobson | |
| 2002/0101096 A1 | 8/2002 | Nagasawa | 296/210 |
| 2003/0001408 A1 | 1/2003 | Hockenberry et al. | 296/146.7 |
| 2003/0015339 A1 | 1/2003 | Sato | 174/65 G |
| 2003/0059255 A1 | 3/2003 | Kirchen | |
| 2003/0093883 A1 | 5/2003 | Gibbons et al. | 24/289 |
| 2003/0180115 A1 * | 9/2003 | Lydan | 411/34 |
| 2005/0184555 A1 | 8/2005 | Williams, II et al. | |
| 2006/0043764 A1 | 3/2006 | Schroder et al. | |

FOREIGN PATENT DOCUMENTS

| | | |
|---|---|---|
| EP | 1215084 | 6/2002 |
| FR | 2438759 A1 | 5/1980 |
| GB | 2287740 | 9/1995 |
| GB | 2 360 322 A | 9/2001 |
| GB | 2 397 088 | 7/2004 |
| WO | 0206682 A3 | 1/2002 |
| WO | WO 02/06682 A2 | 1/2002 |

OTHER PUBLICATIONS

Notice of Allowance and Fee(s) Due, U.S. Appl. No. 10/907,452, filed Apr. 1, 2005, Mailed Aug. 29, 2006 (15 pages).

* cited by examiner

CONNECTOR FOR AUTOMOTIVE INTERIOR TRIM

CROSS-REFERENCE

The present invention is related to U.S. Ser. No. 10/711,478, filed Sep. 21, 2004.

FIELD OF THE INVENTION

The present invention relates generally to automotive interiors, and more particularly, to a connector for securing various trim assemblies to the automotive interior.

BACKGROUND OF THE INVENTION

It is known to provide automotive interiors with various trim assemblies to improve the aesthetic appearance of the automotive interior and for the comfort and convenience of vehicle occupants. Examples of these interior trim assemblies include instrument panels, armrests, door trim, door scuffs, and consoles. The trim assemblies typically comprise a relatively rigid substrate member having a front surface facing the interior of the vehicle and a rear surface opposite the front surface which is adapted to face a vehicle support, such as a vehicle door for example. The rigid substrate provides structural support for the trim assembly and defines the general shape of the trim assembly. Many trim assemblies further include a cover member of leather, cloth, or vinyl disposed over the front surface of the rigid substrate to provide a soft touch and aesthetically pleasing appearance to the interior of the vehicle.

In order to secure the trim assemblies to the vehicle, connectors, such as trim clips, are typically attached to the rear surface of the trim assembly prior to securement of the trim assembly to the vehicle support. The trim clips engage with corresponding apertures provided in the vehicle support to secure the trim panel thereto.

Known trim clips typically include a head portion formed at a proximal end thereof which is configured to be secured to the rear surface of the trim assembly and a shank portion which extends from the head portion toward a distal end of the trim clip. The distal end of the trim clip may include projections extending from the shank portion which are configured to pass through the corresponding apertures formed in the support member of the vehicle so as to secure the trim assembly thereto.

Typically, a seal is formed between the trim assembly and the vehicle support at the locations of the trim clips. To form these seals, automotive manufacturers will typically place a foam gasket around the shank of the trim clip so that the gasket creates a tight seal between the trim assembly and the vehicle support when the trim assembly is secured thereto. To this end, the gaskets are typically cut from a flat sheet of foam stock material and are provided with an adhesive on one surface thereof for attachment to the trim clip. The gasket is manually inserted onto and around the shank portion of the trim clip with the gasket adhered to a portion of the clip. Alternatively, the gasket may be loosely placed around the shank portion of the trim clip with the projections retaining the gasket on the clip prior to securement of the trim assembly with the vehicle support.

One drawback of this type of modular arrangement is that the foam gasket may not provide an effective seal, especially when the surface of the trim clip to which the gasket is adhered is irregular or otherwise not matching the generally planar surface of the gasket. This mismatch in contours may permit air, dust, moisture, and other contaminants to pass through gaps often created at the locations of the trim clips and eventually into the interior of the automobile. These contaminants may lead to occupant discomfort or eventually to the deterioration of the vehicle, such as through rusting. Furthermore, the gaps created at the location of the trim clips may expose the interior of the automobile to increased road, engine and vibration based noises. These noises tend to irritate the vehicle's occupants as conversation, listening to music, and other audio activities inside the vehicle become difficult.

Another drawback of the modular arrangement is that conventional methods for producing trim clips with foam gaskets are manufacturing intensive, requiring multiple operations, multiple parts, and manual labor to produce the desired end product. The increased operations, parts, and manual labor of this process contribute to increased manufacturing costs of the various trim assemblies. Also, the gasket may become detached from the trim clip prior to securement of the trim assembly with the vehicle support.

Therefore, a need exists for a trim clip and sealing gasket combination that overcomes these and other drawbacks of known trim clips for securing interior trim assemblies to an automotive interior.

SUMMARY OF THE INVENTION

The present invention overcomes the foregoing and other shortcomings and drawbacks of trim clips or connectors heretofore known for securing interior trim assemblies to automotive interiors. While the invention will be described in connection with certain embodiments, it will be understood that the invention is not limited to these embodiments. On the contrary, the invention includes all alternatives, modifications and equivalents as may be included within the spirit and scope of the present invention.

The present invention provides a connector having an integral gasket that is used to secure a trim assembly to a support member of an automobile and provide an effective seal therebetween. The connector of the present invention may be used to secure an instrument panel, armrest, door trim, door scuff, console, or any other trim assembly to the automobile.

In accordance with one aspect of the present invention, the connector includes a connector body having a head portion formed at a proximal end of the connector body which is configured to be connected with the trim assembly. The connector body has a shank portion which extends from the head portion toward a distal end of the connector body. The shank portion is configured to connect with apertures formed in the vehicle support member.

In accordance with the principles of the present invention, the connector further has a sealing gasket integrally molded to the connector body distally of the head portion. In one embodiment, the connector is formed during a two-shot molding operation so that the sealing gasket is cohesively bonded to the connector body. The sealing gasket is adapted to form a tight seal between the trim assembly and the vehicle support member when the trim assembly is mounted to the automobile.

The two-shot molding operation used to form the connector of the present invention reduces the number of parts and labor required to manufacture the connector and also minimizes any mismatch at the interface between the sealing gasket and the connector. The two-shot molding operation also reduces the possibility of the gaskets becoming detached from the connectors prior to securement of the trim assembly with the vehicle support.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE PREFERRED EMBODIMENT

Figure 1:
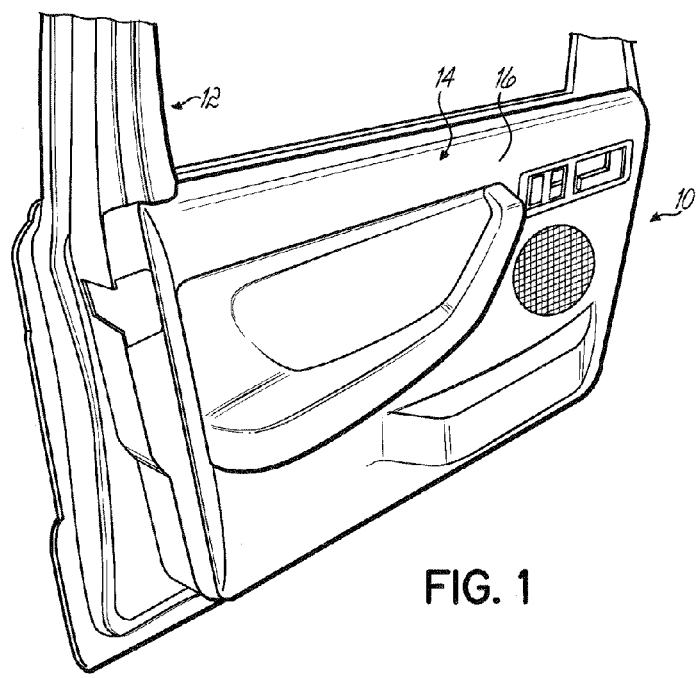
FIG. 1 is a perspective view of an automobile door showing an exemplary interior trim assembly secured to an automotive door using connectors according to the principles of the present invention.
Figure 2:
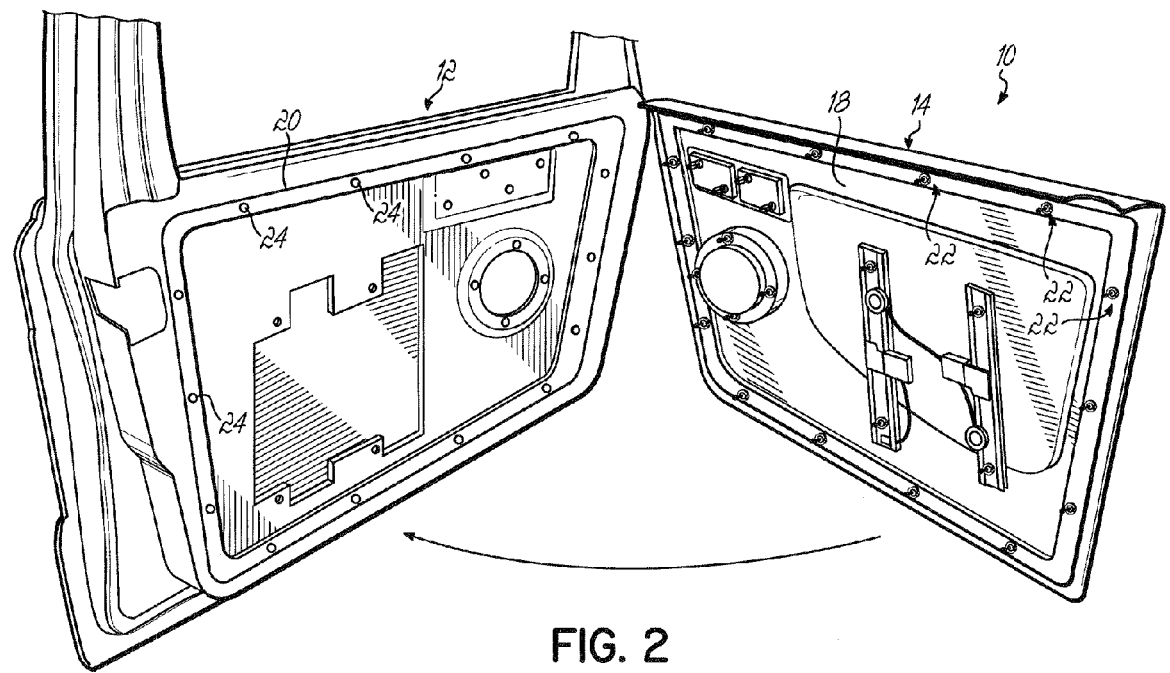
FIG. 2 is a view similar to FIG. 1 showing the trim assembly prepared to be secured to the automobile door using the connectors of the present invention.

With reference to FIG. 1, an exemplary trim assembly, such as a section of door trim 10, is shown mounted to the interior side of an automobile door 12 to improve the aesthetic appearance of the automotive interior and for the comfort and convenience of vehicle occupants. As shown in FIG. 2, the door trim 10 includes a relatively rigid substrate member 14, which generally provides structural support for the trim assembly. The substrate member 14 includes a front surface 16 that faces the interior of the automobile and a rear surface 18 opposite the front surface 16 that is hidden from view when the trim assembly 10 is mounted to the automobile.

For economy cars, the front surface 16 of the rigid substrate member 14 may include a decorative design, such as a grained or textured pattern formed directly on the front surface 16. For more luxury-oriented cars, however, a cover member of leather, cloth, or vinyl may be disposed over the front surface 16 of the substrate member 14 to provide a soft touch and aesthetically pleasing appearance to the door trim 10.

Figure 3:
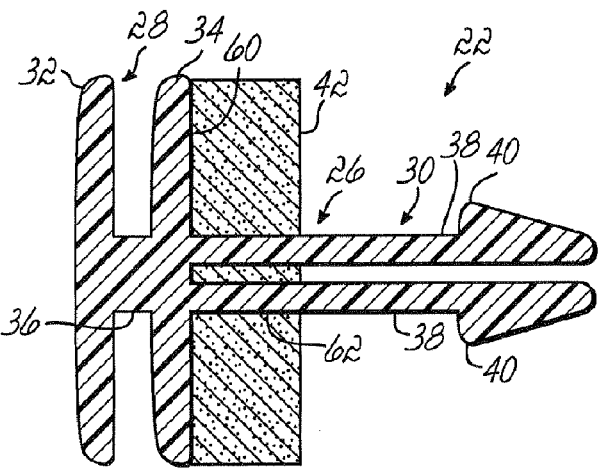
FIG. 3 is a side elevational view of a connector according to one embodiment of the present invention.

The door trim 10 is typically secured to a vehicle support member 20 by one or more connectors, generally shown at 22 in FIGS. 2 and 3, that have one end coupled to the rear surface 18 of the rigid substrate member 14. The opposite ends of the connectors 22 are received within corresponding apertures 24 provided in the vehicle support 20 to secure the trim assembly 10 to the automobile, as will be discussed in greater detail below. Various other trim assemblies may be generally secured to the automobile in a similar fashion. Thus, while the following detailed description will be directed toward a connector for securing door trim, those of ordinary skill in the art will recognize that the connector of the present invention may be used in other embodiments to secure other types of trim assemblies commonly found in automobiles, such as door scuffs, consoles, instrument panels, and other interior trim assemblies.

Referring now to FIG. 3, a connector 22 according to one aspect of the present invention comprises a connector body 26 having a head portion 28 formed at a proximal end thereof which is configured to mount with the rear surface 18 of the trim assembly 10 as described in greater detail below. In their mounted positions, the connectors 22 extend outwardly from the rear surface 18 of the trim assembly 10 and toward the support member 20 of the vehicle as shown in FIG. 1.

As shown in FIG. 3, the connector 22 further includes a shank portion 30 which extends from the head portion 28 toward a distal end of the connector 22. In one embodiment, the head portion 28 includes first and second radially outwardly extending heads 32 and 34 with the second head 34 spaced apart distally from the first head 32. A stem portion 36 extends intermediate the first and second head portions 32 and 34. In one embodiment, the distal end of the connector 22 is bifurcated so as to form a pair of axially extending projections 38 which are configured to mount within the corresponding apertures 24 provided in the vehicle support 20 to secure the trim assembly 10 to the automobile. The projections 38 are resilient so as to be compressible toward each other when a radially inward force is applied to the projections 38 and return to their static positions when the radially inward force is removed. The projections 38 are provided with radially outwardly directed barbs 40 which are configured to mount with the vehicle support 20 to secure the trim assembly 10 to the automobile. Of course, other configurations of the connector 22 are possible as well without departing from the spirit and scope of the present invention.

As shown in FIG. 3, and in accordance with the principles of the present invention, the connector 22 further includes a sealing gasket, generally shown at 42, that is integrally molded to the connector body 26. The sealing gasket 42 comprises a generally annular body having a relatively uniform thickness that is integrally molded to the connector body 26 distally of the second head 34.

Figure 6A:
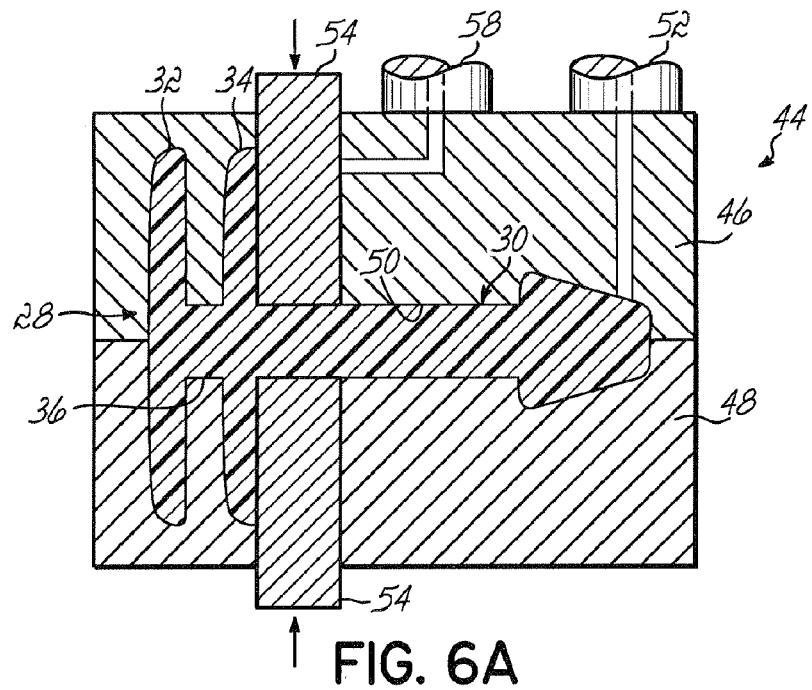
FIGS. 6A–6C diagrammatically illustrate one embodiment of a two-shot molding operation used to form the connector shown in FIG. 3.

An exemplary method of making the connector 22 in a two-shot molding operation according to one embodiment of the present invention will now be described with reference to FIGS. 6A through 6C. As shown in FIG. 6A, a mold station, generally shown at 44, comprises first and second mold portions 46, 48 which may be assembled together to define an interior cavity 50 having the general shape of the connector body 26. To this end, the connector body 26 is formed during the first shot of the two-shot molding operation by injecting a first material from inlet 52 into the cavity 50 of the mold station 44.

Each of the mold portions 46, 48 has a slide 54 that is movable between first and second positions. During the first shot of the two-shot molding operation, the pair of slides are moved inwardly to the first position as shown in FIG. 6A to define wall portions of the cavity 50.

Figure 6B:
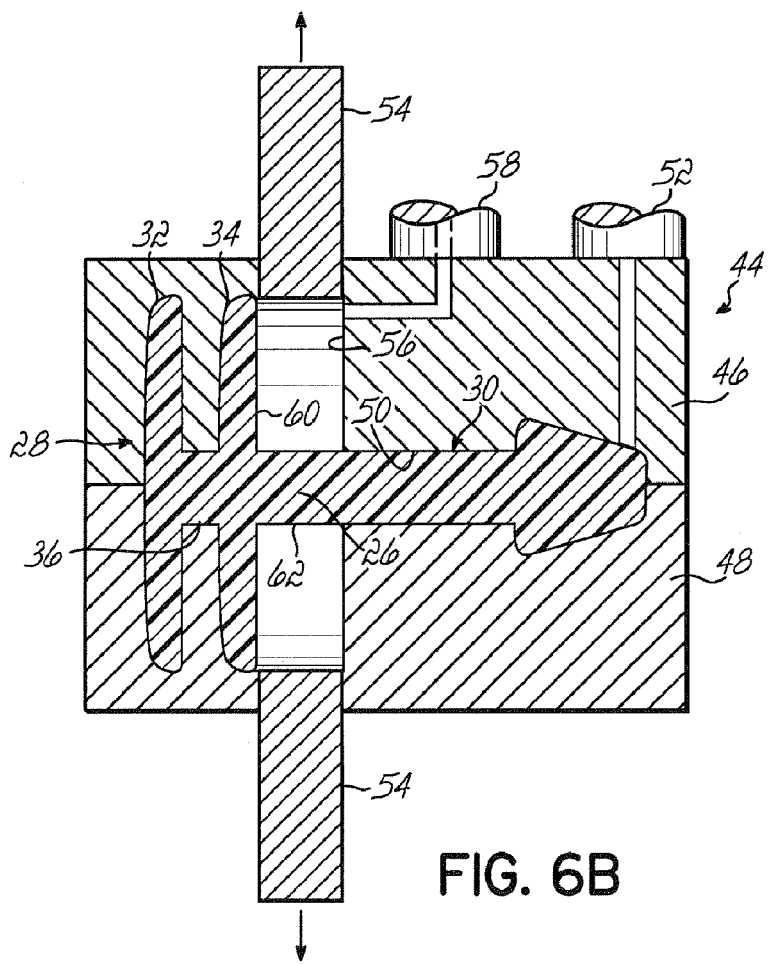
Figure 6C:
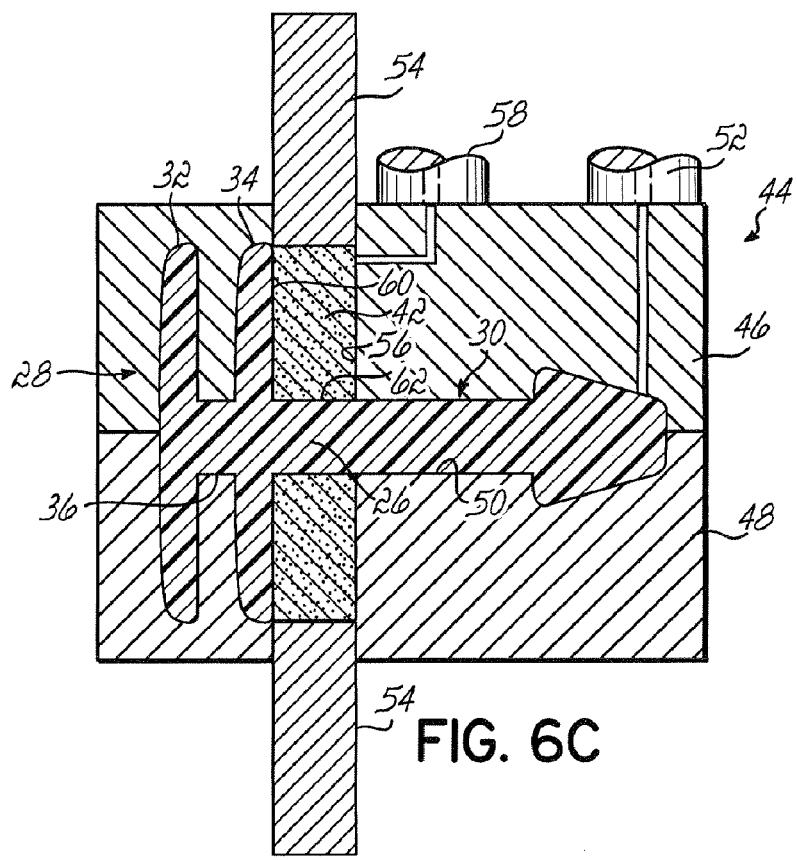

As shown in FIGS. 6B and 6C, after the first material is injected into the cavity 50 to form the connector body 26, the slides 54 are moved outwardly to the second position to define a second cavity 56 for the second shot of the two-shot molding operation. The second cavity 56 defines the general shape of the sealing gasket 42. As shown in FIG. 6C, a second material is injected into the cavity 56 from inlet 58 during the second shot of the two-shot molding operation to form the sealing gasket 42 on the connector body 26 distally of the second head 34. Thereafter, the mold portions 46, 48 are separated to free the connector 22 from the mold station 44.

Figure 7A:
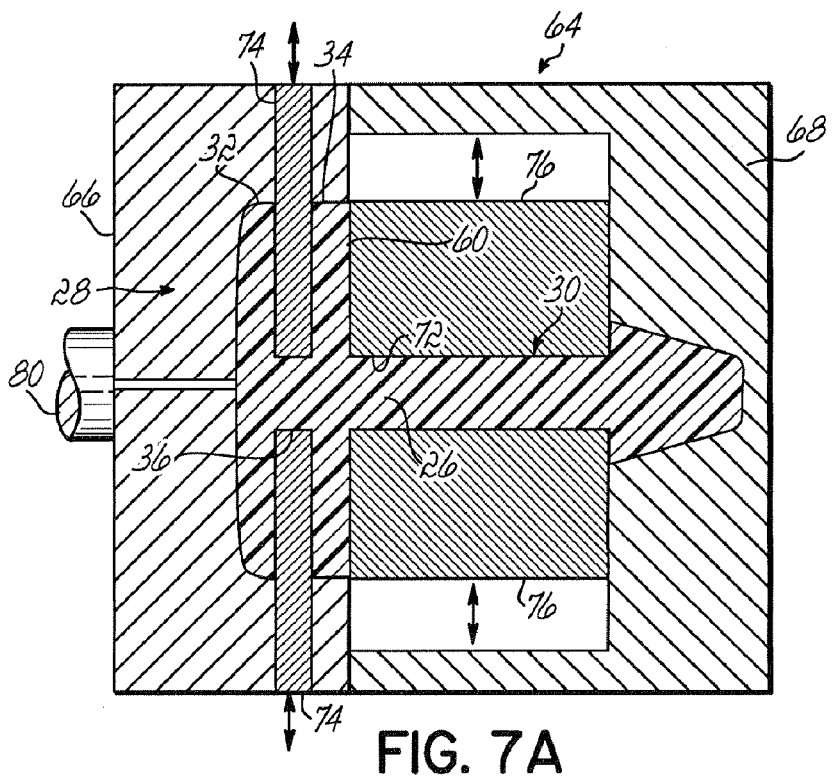
FIGS. 7A–7B diagrammatically illustrate an alternative embodiment of a two-shot molding operation used to form the connector shown in FIG. 3.
Figure 7B:
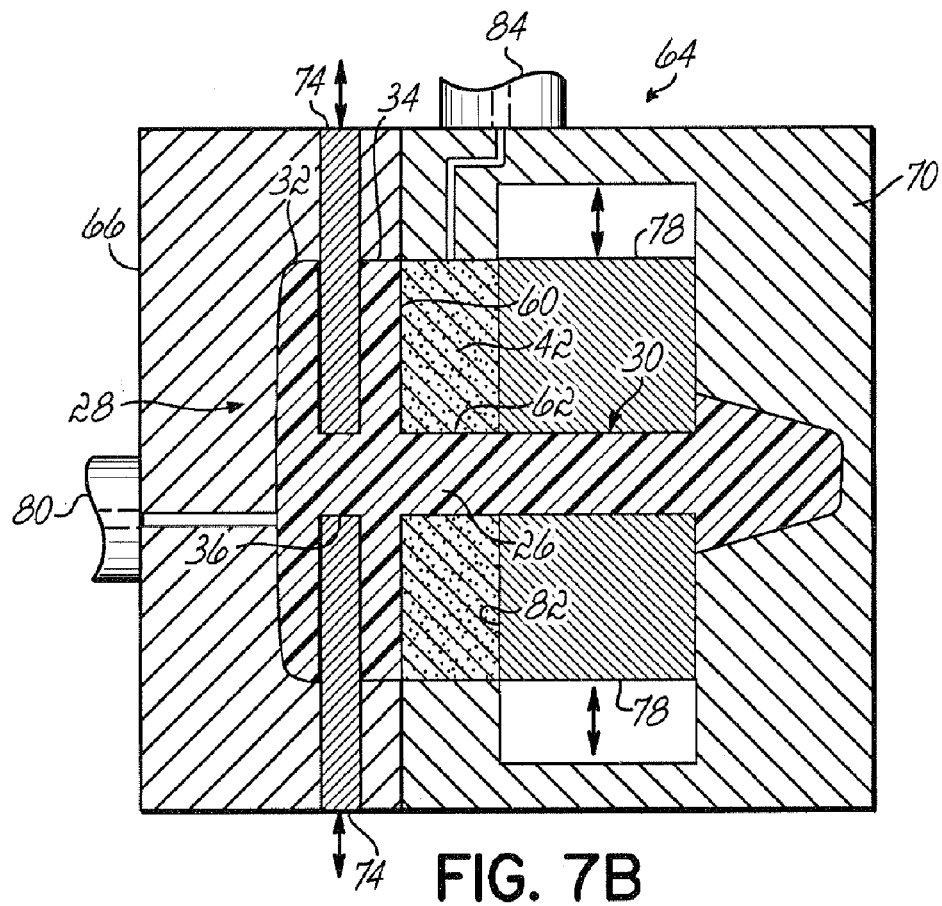

A two-shot molding operation for making the connector 22 according to an alternative embodiment of the present invention is shown in FIGS. 7A–7B. In this embodiment, a mold station 64 is provided having a first mold portion 66 and a pair of second and third mold portions 68 (FIG. 7A) and 70, (FIG. 7B). The second and third mold portions 68, 70 are rotatably mounted on a carrier (not shown) and are separately engagable with the first mold portion 66.

As shown in FIG. 7A, the first and second mold portions 66 and 68 are assembled together to define a cavity 72 having the general shape of the connector body 26. Each of the mold portions 66 and 68 has respective slides 74 and 76 that are movable between first and second positions. In the first position as shown in FIGS. 7A and 7B, the slides 74 and 76 are moved inwardly to define wall portions of the cavity 72. The connector body 26 is formed during the first shot of the two-shot molding operation by injecting a first material from inlet 80 into the cavity 72 as shown in FIG. 7A.

After the first shot of the two-shot molding operation is completed to form the connector body 22, the slides 76 of the second mold cavity 68 are moved outwardly to the second position (not shown) to provide a clearance so that the second mold portion 68 can be separated from the first mold portion 66.

The second shot of the molding operation is performed by rotating and then engaging the third mold portion 70 with the first mold portion 66 to define a cavity 82 for molding the sealing gasket 42 within the cavity 82. As shown in FIG. 7B, a second material is injected into the cavity 82 from inlet 84 during the second shot of the two-shot molding operation to form the sealing gasket 42 on the connector body 26 distally of the second head portion 34. Thereafter, the slides 74 and 78 are moved outwardly to the second position to provide a clearance for separation of the first and third mold portions 66, 70 to free the connector 22 from the molding station 64.

In one embodiment as shown in FIGS. 3, 6C and 7B, the sealing gasket 42 is cohesively bonded to a distal surface 60 of the second head 34 and to a circumferential portion 62 of the connector body 26. In this way, the sealing gasket 42 is bonded directly to the connector body 26 during the two-shot molding operation. The molded connector 22 is thereafter mounted to the substrate member 14 of a trim assembly, such as the door trim 10, and the trim assembly 10 is then mounted to the interior of the automobile as previously described.

A variety of materials may be used to form the sealing gasket 42 and the connector body 26. In one embodiment, the connector body 26 has a first hardness and the sealing gasket 42 has a second hardness that is generally less than the first hardness. For example, the connector body 26 may be formed from polypropylene and the sealing gasket 42 may be formed from a thermoplastic elastomer, although other materials are possible as well. The relatively lower hardness of the second material enables the sealing gasket 42 to form a tight seal between the trim assembly 10 and support member 20 of the vehicle as described in greater detail below.

Figure 4:
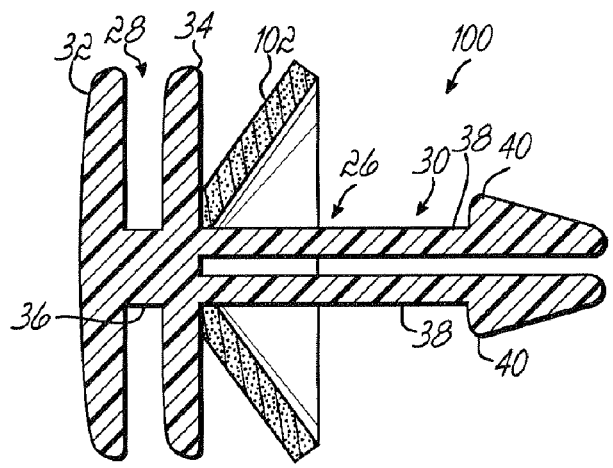
FIG. 4 is a view similar to FIG. 2 showing a connector according to a second embodiment of the present invention.
Figure 8:
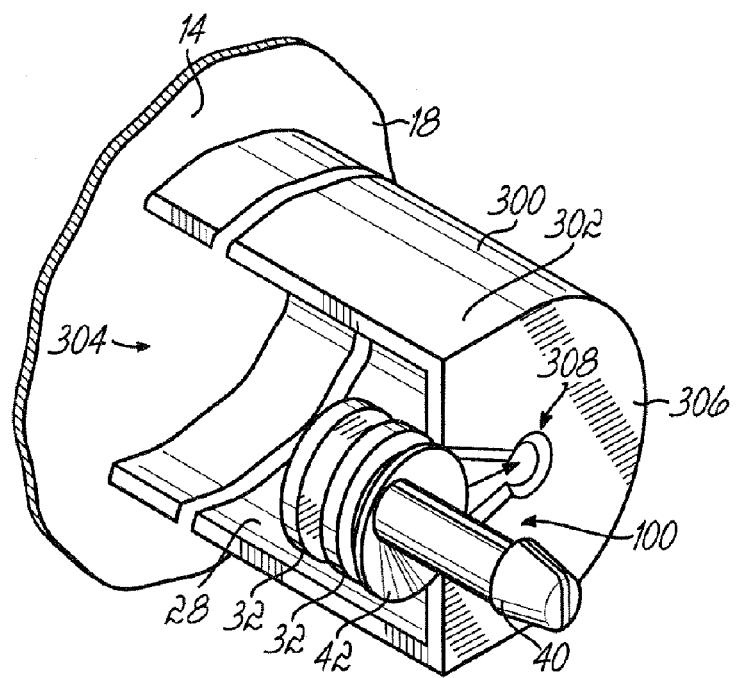
FIG. 8 is a perspective view illustrating mounting of the connector shown in FIG. 4 to the trim assembly.
Figure 9:
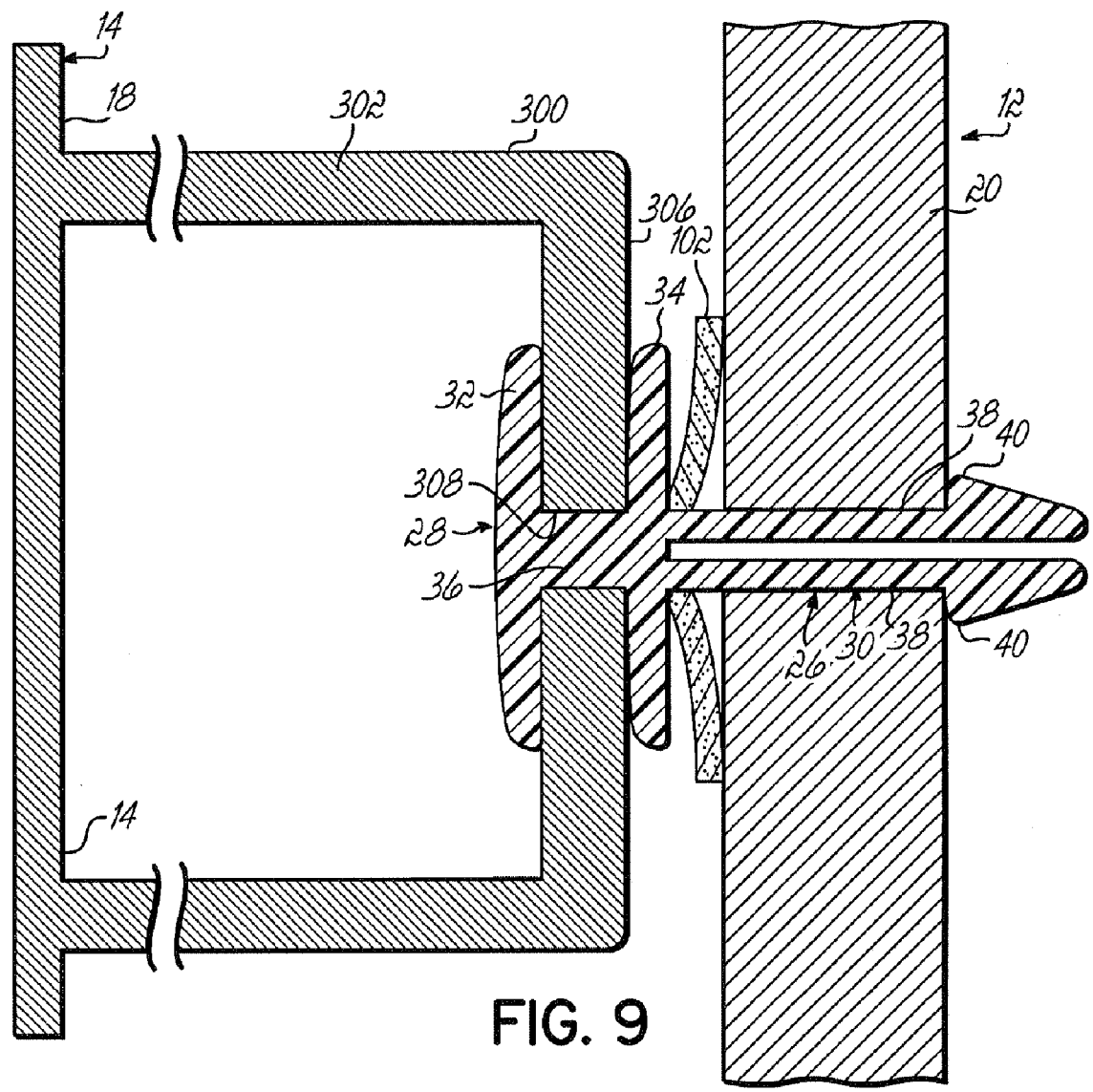
FIG. 9 is a side elevational view, partially in cross-section, showing securement of the trim panel to the automobile door using the connector of FIG. 4.

Referring now to FIGS. 4, 8 and 9, a connector 100 according to another aspect of the present invention is shown, where like numerals represent like parts to the connector 22. In this embodiment, a sealing gasket 102 comprising a generally annular body having a relatively uniform thickness is integrally molded to the connector body 26 distally of the second head 34. The sealing gasket 102 is cohesively bonded to the shank portion 30 of the connector 100 and has generally frusto-conical shape. The connector body 26 may have a first hardness and the sealing gasket 102 may have a second hardness that is less than the first hardness as described in detail above in connection with connector 10. As will be appreciated by those of ordinary skill in the art, the connector 100 may be formed in a two-shot molding operation.

Figure 5:
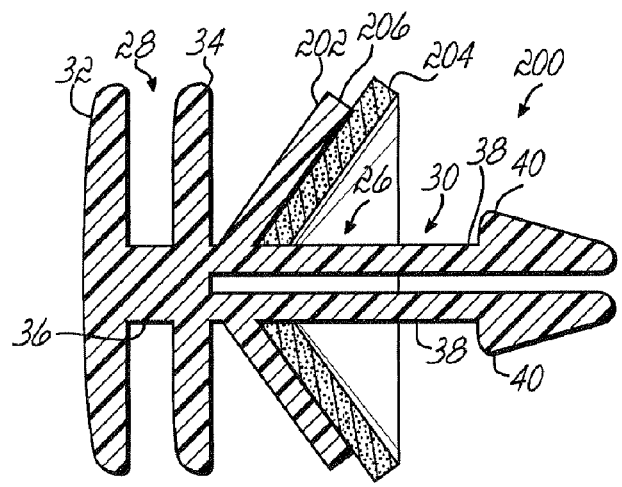
FIG. 5 is a view similar to FIG. 2 showing a connector according to a third embodiment of the present invention.

Referring now to FIG. 5, a connector 200 according to yet another aspect of the present invention is shown, where like numerals represent like parts to the connector 10. The connector 200 comprises a connector body 26 having a head portion 28 and shank portion 30 that are configured in a similar manner to the head portion 28 and shank portion 30 of connector 10. In this embodiment, the connector body 26 includes an integral sealing flange 202 having a generally frusto-conical shape. The sealing flange 202 extends outwardly from the shank portion 30 distally of the second head 34.

The connector 200 further includes a sealing gasket 204 comprising a generally annular body having a relatively uniform thickness that is integrally molded to the connector body 26 distally of the sealing flange 202. The sealing gasket 204 is disposed about the shank portion 30 of the connector 200 and has a generally frusto-conical shape so that the sealing gasket 204 extends beyond a free edge 206 of the sealing flange 204. The connector body 26 may have a first hardness and the sealing gasket 202 may have a second hardness that is less than the first hardness as described in detail above. The connector 200 may be formed in a two-shot molding operation as described in detail above with reference to connector 10.

Referring now to FIGS. 2, 8 and 9, the trim assembly 10 is provided with generally tubular bosses 300 which extend outwardly from the rear surface 18 of the trim assembly 10 and toward the support member 20 of the vehicle. Each boss 300 includes a generally tubular side wall 302, an opening 304 formed in the tubular sidewall, and an end wall 306 provided at the distal end of the boss. The end wall 306 is provided with a keyhole slot 308 which is configured to receive and secure a connector of the present invention therein, such as connector 100 of FIG. 4 by way of example.

As shown in FIGS. 8 and 9, the connector 100 is mounted within the keyhole slot 308 with a snap fit so that the first and second heads 32, 34 are positioned on opposite sides of the end wall 306 and the shank portion 30 of the connector 100 extends toward the support member 20 of the vehicle. Connectors 10 and 200 are mounted to the tubular bosses 300 in a similar manner. It will be appreciated by those of ordinary skill in the art that other structures for mounting the connectors 10, 100 and 200 to the trim panel 10 are possible as well.

As shown in FIG. 9, as the door trim 10 is pressed against the interior side of the automobile door 12, the projections 38 of the connectors 100 pass through the corresponding apertures 24 formed on the vehicle support member 20. The projections 38 and their barbs 40 cooperate with the vehicle support member 20 to secure the trim assembly 10 to the vehicle support member. Furthermore, as the trim assembly 10 is pressed toward the vehicle support member 20, the sealing gasket 102 compresses and forms a seal between the trim assembly 10 and the vehicle support member 20 at the locations of the connectors 100 as shown in FIG. 8. While not shown, it will be appreciated that connectors 10 and 200 operate in a similar manner to mount the trim assembly 10 to the vehicle support member 20.

The connectors 10, 200 and 300 of the present invention are advantageous in that the integrally molded sealing gaskets 42, 102 and 204 eliminate gaps between the trim assembly 10 and the vehicle support member 20 at the locations of the connectors 10, 200 and 300. Consequently, contaminants are prevented from passing through the areas where the connectors 10, 200 and 300 are located. Also, the connectors 10, 200 and 300 of the present invention help to prevent various road, engine, and other external noises from entering the interior of the automobile.

Moreover, the two-shot molding operation of the present invention greatly simplifies the manufacture of the connectors 10, 200 and 300 by reducing the number of parts and labor involved in manufacture of the connectors. The two-shot molding operation also minimizes any mismatch at the interface between the sealing gasket and the connector and significantly reduces the possibility of the gaskets becoming detached from the connectors prior to securement of the trim assembly with the vehicle support.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of Applicants' general inventive concept.

What is claimed is:

1. A connector for securing a trim assembly to a support of an automobile, comprising:

a connector body having a head portion including a first head and a second head spaced distally apart from said first head formed at a proximal end of said connector body and configured to be operatively connected with the trim assembly and a shank portion extending from said head portion toward a distal end of said connector body and being configured to operatively connect with the support, said head portion and said shank portion of said connector body being made of a first material having a first hardness; and a sealing gasket integrally molded onto said connector body distally of said second head and in contact therewith so as to be non-movable along the length of said shank portion, said sealing gasket extending radially outwardly from said shank portion and being made of a second material having a second hardness, said sealing gasket being adapted to form a seal between said head portion of said connector body and the trim assembly when the trim assembly is coupled to the support member.

2. The connector of claim 1, wherein said sealing gasket has a hardness which is generally lower than a hardness of said connector body.

3. The connector of claim 1, wherein said connector body is formed from polypropylene.

4. The connector of claim 3, wherein said sealing gasket is formed from a thermoplastic elastomer.

5. The connector of claim 1, wherein said sealing gasket comprises a generally annular body.

* * * * *